Nov. 10, 1942. J. B. PARSONS ET AL 2,301,576
WINDOW ACTUATING MECHANISM
Filed May 23, 1939 2 Sheets-Sheet 1
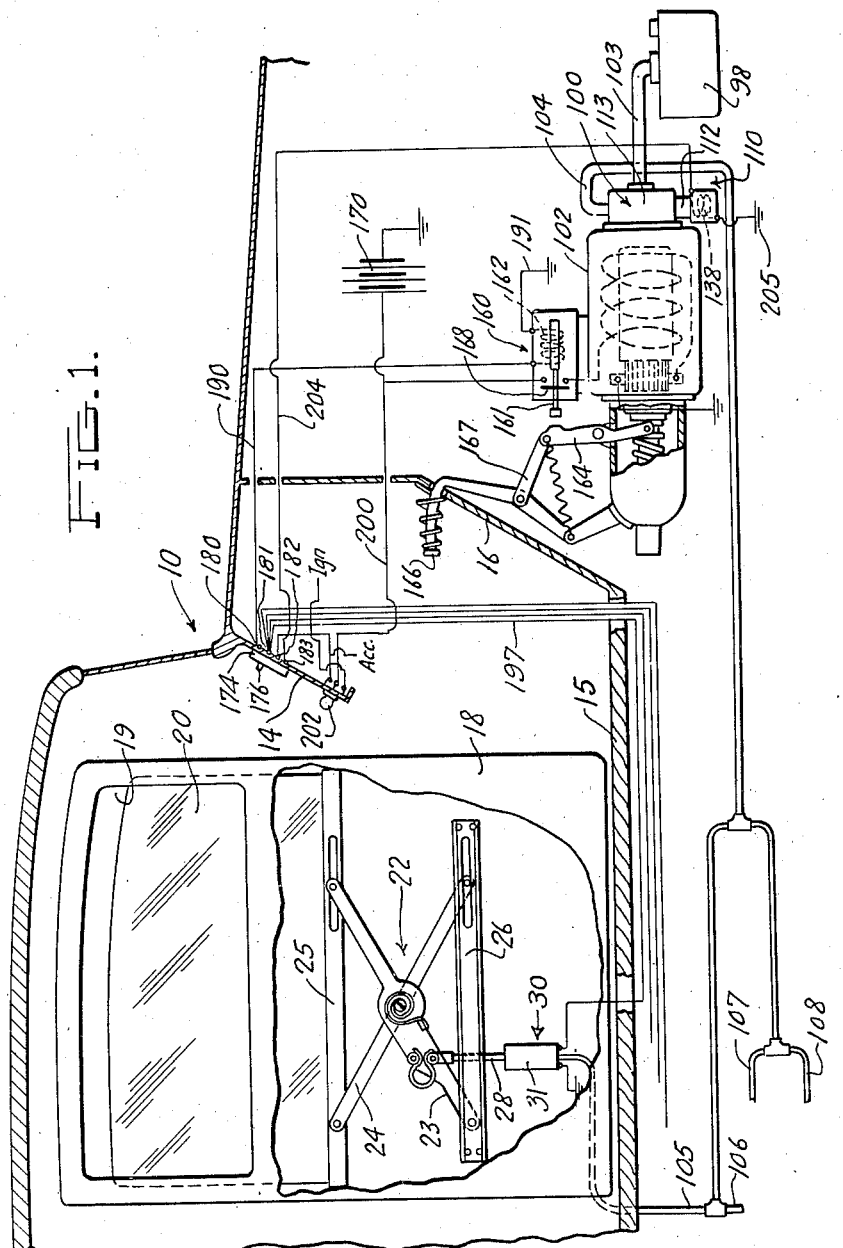
Inventor
John B. Parsons
Burton S. Floraday
By Malcolm W. Fraser
Attorney

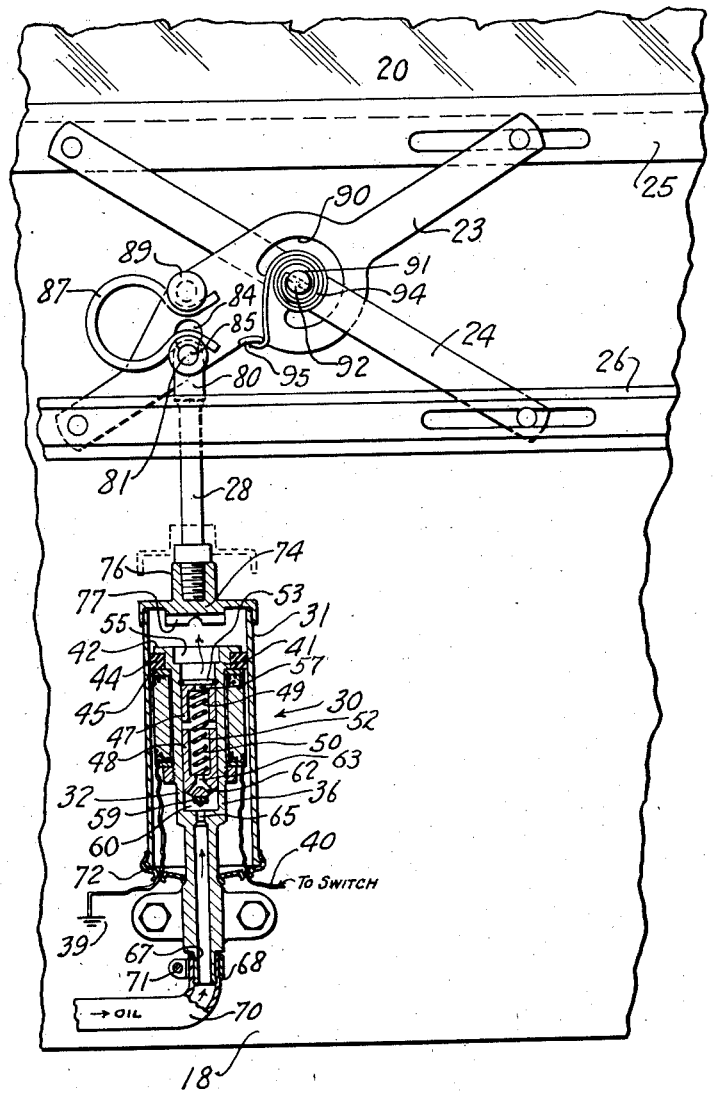
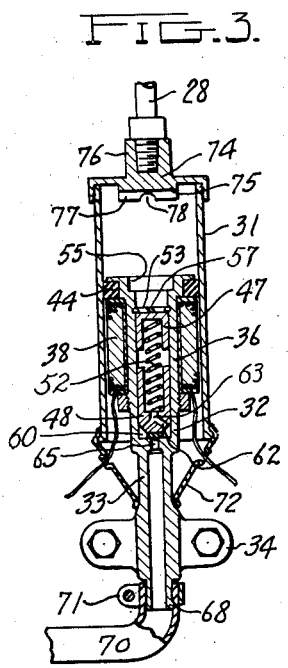

Patented Nov. 10, 1942

2,301,576

UNITED STATES PATENT OFFICE 2,301,576

WINDOW ACTUATING MECHANISM

John B. Parsons and Burton S. Floraday, Toledo, Ohio; said Floraday assignor to Detroit Harvester Company, Detroit, Mich., a corporation of Michigan Application May 23, 1939, Serial No. 275,207

1 Claim. (Cl. 121—40)

This invention relates to automotive vehicle window regulators, and is particularly directed to automatic means for controlling the windows of such vehicles.

An object of the present invention is to provide means for opening and closing automobile windows, controllable by means located within easy access of the operator, or other occupant, of the vehicle.

Another object of the invention is to provide fluid actuated means which are electrically controlled for operating the windows.

A further object is to provide a novel remotely controlled power cylinder for regulating the position of one of a plurality of windows, wherein valve means are provided to govern the amount of window opening and retain the window in adjusted position.

Further objects of the invention will appear as the description proceeds in connection with the accompanying drawings, in which:

Figure 1 is a diagrammatic view of one embodiment of the present invention, only one of the plurality of windows to be operated being illustrated;

Figure 2 is an enlarged fragmentary view of the window and operating means shown in Figure 1, with the power cylinder of the invention shown in vertical section; and Figure 3 is an enlarged vertical sectional view of the power cylinder in another position of operation.

Figure 1 illustrates somewhat fragmentarily a portion of an automobile indicated generally at 10, and shown as including an instrument board 14, floor 15 and toe board 16. One of the doors 18 of the vehicle is shown as including a window opening 19 adapted to be closed by means of a glass or other transparency 20. Mounted interiorly of the door 18 and below the glass 20 is the window operating means indicated generally at 22, and including a pair of levers 23 and 24 pivotally connected intermediate their ends, and each having one end pivoted respectively to a glass supporting channel 25 and a support 26 carried by the door. Lever 23 is connected by a link 28 for operation by a power unit, indicated generally at 30 and illustrated in detail in Figures 2 and 3.

The power unit 30 comprises a reciprocable cylinder 31 connected to the lower end of link 28, and within which is positioned a piston 32 supported by a bracket 34 fixed to the door structure 18. The piston 32 comprises a sleeve-like body portion 36 preferably integral with a reduced tubular portion 33 carried by the bracket, it being understood that the sleeve and tube may be separate elements if desired. On the outside of sleeve 36 is positioned a coil or winding 38, one end being grounded as at 39 and the other end being connected to a switch, hereinafter described, by a lead 40. The sleeve 36 is enlarged at 41 and formed with a flange 42 providing a shoulder for the reception of an annular gasket 44, the outer periphery of which is snugly received in the bore of the cylinder 31. A washer 45 is interposed between the upper end of coil 38 and gasket 44 and serves to prevent longitudinal displacement of the latter. Within the bore of sleeve 36 is a valve mechanism including upper and lower sections 47 and 48, having internal bores 49 and 50 within which is positioned a helical expansion spring 52 tending to separate the valve sections and retain the valve in normally closed position. A snap ring 53 received in an annular recess in the bore of sleeve 36 serves to limit movement of valve section 47 in one direction, and locates section 47 to provide a chamber 55 in the open end of sleeve 36. The chamber 55 is in communication with the interior of the valve by a relatively small aperture 57 in the end of section 47. The lower end of section 48 is tapered and provided with a rubber or other flexible material tip 59 of reduced diameter and having a flat end portion for engagement with the inner end of tube 33. Thus, a chamber 60 is provided between the tapered end of section 48 and the upper end of tube 33, which chamber is in communication with the interior of the valve structure by means of angularly disposed apertures 62 opening into a central bore 63 in the lower valve section 48.

The upper end of tubular portion 33 is in communication with sleeve 36, the bore of the tube opening into chamber 60 through an orifice 65, which is adapted to be closed by the tip 59 of valve section 48 when the latter is in its lowermost position. The other end of the tube 33 is reduced as at 67 and provided with an annular shoulder 68 to have a force fit in the end of a rubber or other flexible conduit 70 adapted to carry fluid under pressure to the power unit in a manner hereinafter appearing. A clamp 71 may be utilized to further insure a positive connection between the tube and conduit.

The lower end of cylinder 31 is closed by means of a flexible cover 72 interposed between the end of the cylinder and the tube 33, and thus dirt and other foreign matter is excluded from the interior of the cylinder. The upper end of the cylinder is provided with an end head 74 having inner and outer generally cylindrical projections 75 and 76, respectively. Suitably secured to the face of the inner projection 75 is a rubber or rubber-like disc 77 provided with a transverse slot or groove 78. The disc 77 serves to cushion the engagement between the end head and the end of sleeve 36 when the cylinder 31 approaches its lowermost position during reciprocation, slot 78 serving to vent any fluid that might be trapped in the chamber 55 during the down stroke of the cylinder. The outer projection 76 may be internally threaded or otherwise adapted to receive the end of the link 28.

Link 28 may be of any suitable form, such as the rod shown, and is provided with a flattened end portion 80, apertured to receive a pivot element 81 for connection to the lever 23. The pivot 81 has an enlarged head projectable through the larger portion of a slot-like aperture 84 in the lever, and a bearing portion 85 receivable in the smaller portion of the aperture 84. Means in the form of a C-shaped spring 87 has one arm engaging the extremity of the link 28, and the other arm in engagement with the shank portion of a pin 89 affixed to the lever 23. The spring 87 serves to resiliently connect the link 28 to the lever 23, permitting slight relative movement therebetween in the event of expansion of the fluid within the cylinder.

Lever 23 has an arcuate slot 90 therein, through which lever 24 extends, and is formed with a central ear 91 provided with an opening for the reception of a pin 92 carried intermediate the ends of lever 24. One end of a spiral spring 94 is disposed in a transverse bore in the pin, the other end of the spring being in engagement with an ear or projection 95 provided at one side of lever 23. Spring 94 serves to urge the levers in one direction of relative movement, it being noted that the spring is so mounted that during closing movement of the window it is placed under tension, and, consequently, assists in the opening movement of the window.

Referring again to Figure 1, means are illustrated for supplying power to the cylinder 31, as are means for controlling the supply means, and means remote therefrom for energizing or rendering effective the entire system. The power means has been shown as a hydraulic system including a reservoir 98, which need not be a separate reservoir, as the use of the vehicle's brake system reservoir or the crank case of the engine is contemplated as a source of fluid or oil for the present system.

A pump 100 of desired characteristics is an essential element of the present invention, and although the type of fluid pump used is immaterial, a rotary pump may be preferred. The pump 100 is, therefore, illustrated as directly associated with a conventional starting motor 102, and is provided with a fluid supply duct 103 in communication with the reservoir 98, and a conduit 104, suitably branched into any desired number of branches, herein illustrated as four pipes 105, 106, 107 and 108, each of which is connected to a power unit coupled to and capable of operating a window of the vehicle. As illustrated, the pipe 105 leads to the unit 30 associated with window 20 in the door 18, and it will be understood that the other pipes lead to similar units associated with three other windows of the vehicle (not shown).

A valve, indicated generally at 110, is directly associated with or may form a part of the pump 100 for the purpose of controlling the fluid flow during operation of the latter. This valve is illustrated as comprising a generally cylindrical casing portion 112 preferably formed integrally with pump casing 113 mounted at the forward end of starting motor 102. Casing 112 is formed with a side port providing communication with the reservoir 98 through duct 103. The pump 100 and the valve 110 may be that shown in the copending application of John B. Parsons, Serial No. 270,014, filed April 25, 1939, or, alternatively, that shown in the United States patent to John B. Parsons, No. 2,216,518, issued October 1, 1940.

Associated with the starter motor 102 is a combined mechanical and electrical switch indicated at 160. The switch 160 may be closed manually by depression of a plunger 161, or it may be closed electrically by energization of a solenoid indicated by the reference numeral 162. In the illustrated structure a lever 164 is suitably pivoted intermediate its ends and adapted to be rocked about the pivot upon depression of a starter pedal 166 by a link 167 connected therebetween. Depression of the pedal 166 first moves a pinion on the motor shaft into mesh with a gear on the fly wheel of the engine (not shown) and then causes the lever 164 to engage plunger 161 carrying a contact bar 168 into engagement with a pair of contact elements for completing the circuit from a battery 170 to the starting motor. Obviously, if the motor 102 is to be used to supply power to operate the windows of the vehicle, additional means are required to energize the motor so that the driving connection between the starter motor and the engine will not be established at times when it is desired to regulate the windows.

In accordance with standard automotive practice, a single wire system is used to control the organization of the present invention, all circuits leading from the battery to a suitable ground. A switch 174 is mounted for convenient manipulation by the operator of the vehicle as on the dash 14, and may be of any suitable construction, preferably provided with four spaced contacts or binding posts to which certain of the wires of the present circuit are connected. The switch mechanism may be enclosed in a suitable box within which are carried four or more independently operable elements 176 for controlling respectively each of the four or more windows of the vehicle. Each of the switch elements is preferably arranged so that it has a neutral position from which the switch is moved upwardly to energize a circuit to close the window and downwardly to energize a circuit to open the window. Thus, the element 176 is arranged to interconnect a plurality of contact elements 180, 181, 182 and 183, which are connected into the circuit in the following manner. Contact 180 is connected by a lead 190 to one side of the solenoid coil 162, the other side of the solenoid being connected by lead 191 to a suitable ground. Contact 181 is connected to one side of the solenoid coil 38 in unit 30 by a lead 197, it being noted that four leads, one for each window power unit, are illustrated as being connected to the contact 181, which is preferably a four-part contact or four separate contacts. This circuit is completed by suitably grounding the other end of the coil. Contact 182 is connected to a switch 202 in turn connected to the battery 170 by means of a lead 200. Switch 202 may, if desired, be a conventional ignition or accessory switch of the vehicle, or a combined ignition and accessory switch.

Contact 183 is connected by a lead 204 to one side of the coil 138 mounted on the flow control valve 110, the other side of the coil being grounded at 205.

The circuit thus far described is capable of energizing the starting motor to operate the pump to open or close the window. Should it be desired to open the window, switch element 176 is moved downwardly, in which position the contacts 180, 181, 182 and 183 are adapted to be bridged and when these contacts are thus connected current will flow from battery 170 through lead 200, switch 202, switch 174, lead 190 to solenoid coil 162 to energize the solenoid and close switch 160 to energize motor 102. At the same time, lead 204 is supplied with current to energize solenoid coil 138 to move the valve 110 to position to permit fluid to be pumped from the power unit 30 and be discharged into the reservoir 98. It will be noted that the circuit is such that the coil 38 in unit 30 is also simultaneously energized to raise the valve section 48 to permit fluid to be pumped out of the power unit.

When it is desired to close the window the switch element 176 is moved upwardly, in which position only contacts 180, 181 and 182 are bridged or connected into the circuit. Thus flow control valve solenoid coil 138 is not energized, so that valve 110 is in a position to permit passage of fluid from the reservoir 98 to the power unit 30. In this instance valve section 48 is in its upper position to permit the passage of fluid into cylinder 31, as shown in Figure 2. The valve 110 serves to reverse the connections of the pump inlets and outlets with respect to the pipes 103 and 104.

As shown particularly in Figure 3, when coil 38 is not energized, the valve section is in its lower position to trap fluid between the piston and cylinder to hold the cylinder in position to locate the window as desired.

Although switch 174 has been illustrated as being located on the dash 14 within easy access of the vehicle operator, it will be clearly understood that a duplicate switch or switches may be located elsewhere in the vehicle and connected to switch 174 in order that the windows may be operated by other occupants of the vehicle.

It will be understood that changes in details of construction, arrangement and operation may be effected without departing from the spirit of the invention, especially as defined in the appended claim.

What we claim is:

A power unit comprising a reciprocable cylinder closed at one end, an elongated piston member disposed within said cylinder with a short portion of the length of said piston member being in sealing contact with the inner wall of said cylinder while the remainder of the length of said piston member is of reduced diameter, a longitudinal bore extending through said piston member to provide a passage for fluid under pressure into the closed end of said cylinder to move said cylinder relative to said piston member, a valve movable longitudinally within said bore, spring means normally urging said valve into position to close said bore, a solenoid surrounding and secured to that portion of said piston member of reduced diameter, said solenoid being of such diameter as to provide a piston skirt for guiding said piston member by contact with the inner wall of said cylinder, said solenoid being adapted, upon energization, to move said valve into position to open said bore, and means for energizing said solenoid.

JOHN B. PARSONS.
BURTON S. FLORADAY.